(12) United States Patent
Vichare et al.

(10) Patent No.: US 12,164,972 B2
(45) Date of Patent: Dec. 10, 2024

(54) INFORMATION HANDLING SYSTEMS AND METHODS TO PROVIDE WORKLOAD REMEDIATION BASED ON WORKLOAD PERFORMANCE METRICS AND CONTEXTUAL INFORMATION

(71) Applicant: DELL PRODUCTS L.P., Round Rock, TX (US)

(72) Inventors: Nikhil M. Vichare, Austin, TX (US); Vivek V. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 524 days.

(21) Appl. No.: 17/510,575

(22) Filed: Oct. 26, 2021

(65) Prior Publication Data
US 2023/0125489 A1    Apr. 27, 2023

(51) Int. Cl.
*G06F 9/46* (2006.01)
*G06F 9/50* (2006.01)

(52) U.S. Cl.
CPC .................. *G06F 9/5083* (2013.01)

(58) Field of Classification Search
CPC ..................................... G06F 9/5083
See application file for complete search history.

(56) References Cited

U.S. PATENT DOCUMENTS

2017/0264493 A1*  9/2017  Cencini ............... H04L 67/1023
2022/0147390 A1*  5/2022  Akinapelli .......... G06F 11/3433

OTHER PUBLICATIONS

Dell US, "Dell Optimizer 2.0", Article No. 184590, Apr. 6, 2021, 71 pgs.
Dell US, "Dell Optimizer: Overview And Common Questions", Article No. 128673, Aug. 16, 2021, 5 pgs.
Docker, "Docker App", Simplify Modern Application Development And Delivery By Bundling Distributed Services Into A Single Docker Application, Obtained from the Internet on Aug. 18, 2021, 8 pgs.
Wikipedia, "Hyper-V", Obtained From Internet Aug. 18, 2021, 15 pgs.

(Continued)

*Primary Examiner* — Gregory A Kessler
(74) *Attorney, Agent, or Firm* — Egan, Enders & Huston LLP

(57) ABSTRACT

The present disclosure provides various embodiments of information handling systems and related methods to provide workload remediation on client devices running multiple concurrent workloads. More specifically, the present disclosure provides software services and computer-implemented methods that utilize workload performance metrics and contextual information to provide workload remediation for each workload/application included within a user's workspace. The disclosed embodiments provide an automated iterative remediation framework, which identifies degradation of workload performance metrics of each workload, takes one or more corrective actions to remediate the performance degradation based on a set of observed states obtained for each workload, measures the efficacy of each corrective action using a weighted scoring function, and improves the workload performance for each workload by selecting the corrective action that optimizes the weighted scoring function for the set of observed states.

28 Claims, 4 Drawing Sheets

(56) References Cited

OTHER PUBLICATIONS

Taylor, "Hypervisor vs. Docker: Complete Comparison Of The Two", Obtained From Internet Aug. 18, 2021, 5 pgs.
Intel, "Intel Clear Containers 1: The Container Landscape", Obtained from Internet on Oct. 13, 2021, 4 pgs.
Duffner, "Powering Docker App: Next Steps For Cloud Native Application Bundles (CNAB)", Obtained from Internet on Aug. 18, 2021, 7 pgs.
Citrix, "What is VDI?—Virtual Desktop Infrastructure Definition", Obtained From Internet Aug. 18, 2021, 4 pgs.

\* cited by examiner

INFORMATION HANDLING SYSTEMS AND METHODS TO PROVIDE WORKLOAD REMEDIATION BASED ON WORKLOAD PERFORMANCE METRICS AND CONTEXTUAL INFORMATION

FIELD

This invention relates generally to information handling systems, and more particularly, to information handling systems and related methods to provide workload remediation for client devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (e.g., a client device) can be utilized to run workloads for a user. A workload generally includes an application and services that are executed to perform various tasks for a user. For example, a user's workload may include an endpoint-native application and/or a cloud-native application, as well as storage, backend services, and associated policies and security needed to run the application. As part of the modern client experience, the concept of a user workspace has been developed and defined to include one or more user workloads, wherein each workload is run on the user's client device (in endpoint-native mode) or in the cloud (in cloud-native mode). Endpoint-native mode utilizes local hardware and software resources to run user workloads/endpoint-native applications on a local machine (e.g., a client device). In contrast, cloud-native mode uses cloud-based hardware and software resources to run user workloads/applications on a remote server or cloud instance (e.g., a virtual machine or virtual server in a public or private cloud environment).

In some cases, a user's workload may include a containerized endpoint-native or cloud-native application. Containers executed on a client device may be software-based or hardware-based. Containers may also be orchestrated to run in the cloud, and may be served up to a client device through virtual desktop infrastructure (VDI) and progressive web applications (PWA). Software-based containers (e.g., Docker, Snap, etc.) running on the client device consume less overhead and provide higher containerized application density than hardware-based containers, and thus, are generally used for applications that are distributed/deployed from a trusted source. In contrast, hardware-based containers (e.g., Hyper-V containers, Intel Clear Containers, etc.) consume more overhead, but provide better isolation and security than software-based containers. As a result, hardware-based containers are typically used for applications that are distributed/deployed from an untrusted source. Regardless of whether a container is software or hardware-based, containers isolate the containerized application from the host applications (i.e., noncontainerized endpoint-native applications running on the client device) and other containerized endpoint-native and cloud-native applications. In some cases, a user's workspace may include multiple workloads running concurrently on a user's client device.

Remediation is the process of correcting a fault, preventing an undesirable outcome or optimizing the system health, performance and/or security of a system or process. Currently available remediation methods for information handling systems provide one-off remediation solutions, which are either pre-programmed based on heuristics or trained using artificial intelligence (AI) and machine learning (ML) to fix one problem at a time. For example, the Dell Optimizer application is one example of a remediation software application that dynamically optimizes the performance of an IHS using AI and ML. The Dell Optimizer application improves the user experience through system usage analysis and learning, provides faster application launch and seamless application transition, optimizes audio for best meeting experience, provides faster system wake on user approach and locks the system when the user walks away for enhanced security.

Workload remediation is the process of correcting an error, preventing an undesirable outcome or optimizing the performance and/or security of a workload. However, workload remediation becomes difficult when multiple workloads are run concurrently on a client device, due to the variability in workload type, container type and numerous factors affecting workload performance.

SUMMARY OF THE INVENTION

The following description of various embodiments of information handling systems and related methods is not to be construed in any way as limiting the subject matter of the appended claims.

The present disclosure provides various embodiments of information handling systems and related methods to provide workload remediation on client devices running multiple concurrent workloads. More specifically, the present disclosure provides software services and computer-implemented methods that utilize workload performance metrics and contextual information to provide workload remediation for each workload/application included within a user's workspace. The disclosed embodiments provide an automated iterative remediation framework, which identifies degradation of workload performance metrics of each workload, takes one or more corrective actions to remediate the performance degradation based on a set of observed states obtained for each workload, measures the efficacy of each corrective action using a weighted scoring function, and improves the workload performance for each workload by selecting the corrective action that optimizes the weighted scoring function for the set of observed states.

According to one embodiment, an information handling system (IHS) provided herein includes a computer readable storage device and a host processor. The computer readable storage device may store workload remediation services, which are executable to improve workload performance of a plurality of workloads included within a user's workspace. In some embodiments, the plurality of workloads may include endpoint-native applications that are stored within the computer readable storage device and executed locally by the host processor and/or cloud-native applications that are stored and executed remotely on a remote server or cloud instance. In some embodiments, one or more of the endpoint-native applications and/or the cloud-native applications may be containerized (e.g., within a local software container, a local hardware container, a cloud virtual machine (VM), a PWA, etc.).

For each workload within the plurality of workloads, the host processor may execute the workload remediation services to: (a) identify degradation of at least one workload performance metric corresponding to the workload; (b) take one or more corrective actions to remediate the degradation of the at least one workload performance metric based on a set of observed states obtained for the workload; (c) measure the efficacy of each corrective action using a weighted scoring function; and (d) improve the workload performance for the workload by selecting a particular corrective action that optimizes the weighted scoring function for the set of observed states.

The at least one workload performance metric may be dependent on the workload. In some embodiments, the at least one workload performance metric include one or more of the following: frames per second (FPS), latency, bit rate, lag, throughput, and input/output operations per second (IOPS).

As noted above, the plurality of workloads included within a user's workspace includes at least one containerized application. In some embodiments, the set of observed states may include telemetry data obtained from the containerized application, administrative configuration policies specified for the containerized application, and/or contextual information about the IHS and/or the user.

A variety of corrective actions may be taken to remediate the degradation of the at least one workload performance metric. In some embodiments, the one or more corrective actions may include one or more of the following: switching the workload to a different container type, switching a cloud resource tier used to process the workload, switching the hardware resources allocated to a container running the workload, switching a security level set for the container running the workload, throttling the power or performance for the container running the workload, boosting the power or performance for the container running the workload, throttling other containers or workloads currently running in the user's workspace, and hibernating other containers or workloads currently running in the user's workspace.

In some embodiments, the weighted scoring function may utilize a variety of weights to account for a plurality of positive workload performance metrics and negative workload performance metrics associated with each corrective action. For example, the weighted scoring function may calculate a difference between a summation of weighted positive workload performance metrics and a summation of weighted negative workload performance metrics. In some embodiments, the workload remediation services may be further executed by the host processor to: determine that the corrective action is worth taking, if the difference calculated by the weighted scoring function is a positive value; determine that the corrective action is not worth taking, if the difference calculated by the weighted scoring function is a negative value; and select the particular corrective action having the highest positive value.

In some embodiments, the workload remediation services may be further executed by the host processor to improve the workload performance for each workload by iterating through different observed states and corrective actions, measuring the efficacy of each corrective action via the weighted scoring function, and selecting the particular corrective action that optimizes the weighted scoring function for the particular set of observed states.

According to another embodiment, a computer implemented method is provided herein to provide workload remediation for a plurality of workloads included within a user's workspace. In some embodiments, the plurality of workloads included within a user's workspace includes at least one containerized application. The computer-implemented method may be performed by a host processor of an information handling system (IHS) executing program instructions stored within a computer readable storage device of the IHS.

For each workload within the plurality of workloads, the computer implemented method may detect one or more concurrently running workloads. For each workload detected, the computer implemented method may further include: applying an action to the workload; collecting data for the workload, the collected data comprising telemetry data obtained from the workload, administrative configuration policies specified for the workload and contextual information and the IHS and/or the user; utilizing the collected data to obtain a set of observed states and workload performance metrics for the workload; supplying the workload performance metrics to a weighted scoring function, which measures the efficacy of the action; applying a new action to the workload and repeating said collecting, said utilizing and said supplying one or more times; and improving workload performance for the workload by selecting a particular action that optimizes the weighted scoring function for the set of observed states.

In some embodiments, the workload performance metrics may include positive workload performance metrics and negative workload performance metrics, and the weighted scoring function may measure the efficacy of the action by: applying weights to the positive workload performance metrics and the negative workload performance metrics; and determining a difference between the weighted positive workload performance metrics and the weighted negative workload performance metrics.

In some embodiments, the computer implemented method may perform one or more additional steps after supplying the workload performance metrics to a weighted scoring function and before said applying a new action to the workload. For example, the computer implemented method may determine that the action is: (i) worth taking if the difference is a positive value, and (ii) not worth taking if the difference is a negative value. In some embodiments, the workload performance for the workload may be improved by selecting the action that achieves the highest positive value.

In some embodiments, the computer implemented method may further include applying the selected action to the workload to improve at least one workload performance metric for the workload. The at least one workload performance metric may be dependent on the workload. In some embodiments, the at least one workload performance metric include one or more of the following: frames per second (FPS), latency, bit rate, lag, throughput, and input/output operations per second (IOPS).

A variety of corrective actions may be taken to remediate the degradation of the at least one workload performance metric. In some embodiments, the one or more corrective actions may include one or more of the following: switching the workload to a different container type, switching a cloud resource tier used to process the workload, switching the hardware resources allocated to a container running the workload, switching a security level set for the container running the workload, throttling the power or performance for the container running the workload, boosting the power or performance for the container running the workload, throttling other containers or workloads currently running in the user's workspace, and hibernating other containers or workloads currently running in the user's workspace.

BRIEF DESCRIPTION OF THE DRAWINGS

Other advantages of the present disclosure will become apparent upon reading the following detailed description and upon reference to the accompanying drawings in which.

Figure 1:
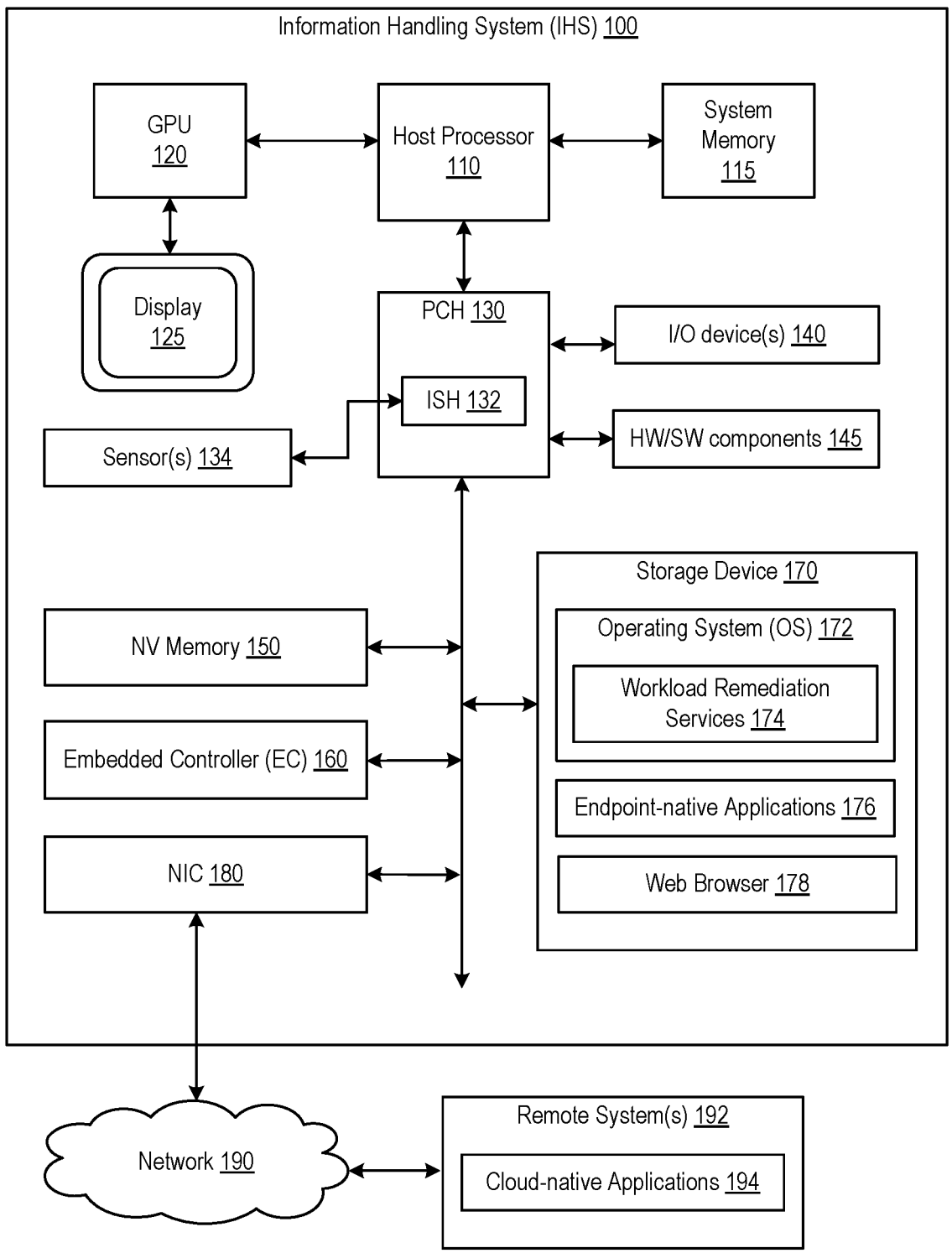
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

The present disclosure provides various embodiments of information handling systems and related methods to provide workload remediation on client devices running multiple concurrent workloads. In particular, the present disclosure provides workload remediation based on workload performance metrics and contextual information about the system, the user and/or the workload. FIG. 1 illustrates one embodiment of an information handling system (IHS) 100 (e.g., a desktop computer, laptop computer, tablet computer, a smart phone, a smart device, an Internet of Things (IoT) device, etc.) in accordance with the present disclosure.

It is expressly noted that the IHS configuration shown in FIG. 1 is exemplary only, and that the methods disclosed herein to provide workload remediation may be implemented on any type and/or configuration of IHS. It will be further understood that while certain components of an information handling system are shown in FIG. 1 for illustrating embodiments of the present disclosure, the information handling system disclosed herein is not restricted to including only those components shown in FIG. 1 and described below.

As shown in FIG. 1, IHS 100 may generally include a host processor 110, a system memory 115, a graphics processor unit (GPU) 120, a display device 125, and a platform controller hub (PCH) 130, which in some embodiments, may include an integrated sensor hub 132 for receiving sensor data from one or more sensors 134. The IHS 100 may further include one or more input/output (I/O) devices 140, additional hardware/software components 145, a computer readable non-volatile (NV) memory 150, an embedded controller (EC) 160, a computer readable storage device 170, and a network interface controller (NIC) 180. Other components not explicitly shown and described herein may also be included within the IHS 100, as is known in the art.

Host processor 110 may be generally configured to execute program instructions (computer program code) to perform a variety of different functions for the IHS. The host processor 110 may be implemented using a wide variety of programmable integrated circuits (e.g., a processor, such as a controller, microcontroller, microprocessor, application specific integrated circuit "ASIC," etc.) and/or programmable logic devices (e.g., a field programmable gate array "FPGA", complex programmable logic device "CPLD", etc.). According to one embodiment, host processor 110 may comprise at least one central processing unit (CPU) having one or more processing cores. As described in more detail below, host processor 110 may execute program instructions (or computer program code) to provide workload remediation for one or more workloads running locally on the IHS 100 or in the cloud. In some embodiments, the program instructions executed by the host processor 110 to provide workload remediation may be stored within computer readable storage device 170, as set forth in more detail below.

System memory 115 is coupled to host processor 110 and configured to store program instructions (or computer program code), which are executable by the host processor 110. System memory 115 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 120 is coupled to host processor 110 and configured to coordinate communication between the host processor and one or more display components of the IHS 100. In the illustrated embodiment, GPU 120 is coupled to display device 125 (e.g., a display screen or monitor) to provide visual images to the user. Although not shown herein, GPU 120 may also be coupled to one or more display ports to support additional display functions. The display ports (not shown) may include any suitable display port or interface including, but not limited to, a High-Definition Multimedia Interface (HDMI), a DisplayPort (DP) interface and/or a mini DisplayPort (miniDP or mDP) interface. Although shown in FIG. 1 as a separate integrated chip coupled to host processor 110 via a bus, GPU 120 may be integrated with the host processor as a silicon-on-chip (SoC) processor.

Platform controller hub (PCH) 130 is coupled to the host processor 110 and configured to handle I/O operations for the IHS 100. PCH 130 may include a variety of communication interfaces and ports for communicating with various IHS components, such as sensor(s) 134, I/O devices 140, additional hardware/software components 143, NV memory 150, EC 160, storage device 170, and NIC 180. Examples of communication interfaces and ports that may be included within PCH 130 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

In some embodiments, an integrated sensor hub (ISH) 132 may be included within the PCH 130 for receiving and processing sensor data and other system data. Alternatively, an external sensor hub (not shown) could be communicatively coupled to the PCH 130 for receiving and processing sensor data and system data. When included within IHS 100, ISH 132 may be coupled to receive sensor data from one or more sensors 134. Examples of sensors 134 may include, but are not limited to, a gyroscope, global positioning system (GPS) sensor, a magnetometer, accelerometer, ambient light sensor, a camera, an eye tracking device or human gaze sensor, a time-of-flight sensor, a motion sensor, an infrared (IR) sensor, a temperature sensor, an acoustic sensor, a vibration sensor, a proximity sensor, a hall effect sensor, a hinge angle sensor, a 9 degrees of freedom (9-DOF) sensor, etc.

In some embodiments, the sensor data received from the one or more sensors 134 may be analyzed by the ISH 132 (or an external sensor hub) to obtain contextual information about the user. For example, sensor data received from a camera, eye tracking device, IR sensor, temperature sensor, etc. may be analyzed to detect user presence (or absence) by determining if a user is physically present at the IHS 100. Sensor data received from a camera or eye tracking device may also be analyzed to determine the user's focus or gaze. Other sensor data may be collected by the one or more sensors 134 and analyzed by the ISH 132 to obtain contextual information about the user.

In some embodiments, the sensor data received from the one or more sensors 134 may be analyzed by the ISH 132 (or an external sensor hub) to obtain contextual information about the system. For example, sensor data may be analyzed to determine contextual information about the system, such as but not limited to, location information (e.g., GPS data and other geographic information), system information (e.g., applications currently running, I/O devices connected/used, system mode (e.g., laptop mode, tablet mode, etc.) and other data pertaining to the system), performance information (e.g., processor performance when running user applications, number of concurrently running applications, and other data pertaining to system performance, etc.), network information (e.g., network access data, such as if the user is using public Wi-Fi without authentication, home Wi-Fi or corporate Wi-fi to access network resources, and other data pertaining to network resources), etc. In some embodiments, contextual information about the system and/or the user may be used herein to perform workload remediation.

I/O device(s) 140 enable the user to interact with IHS 100 and the software/firmware executing thereon. In some embodiments, one or more I/O devices 140 may be provided within IHS 100. In other embodiments, I/O device(s) 140 may be separate from the IHS and may interact with the IHS through a wired or wireless connection. Examples of I/O devices 140 include, but are not limited to, keyboards, keypads, touch screens, cameras, mice, scanning devices, voice or optical recognition devices, fingerprint reader (FPR), and any other devices suitable for entering or retrieving data or receiving user input.

Additional hardware/software resources 145 may be coupled to one or more of the communication interfaces and ports contained within PCH 130 to provide additional functionality to the IHS 100. Examples of additional hardware/software resources 145 include, but are not limited to, a video card, sound card, small system computer interface (SCSI) controller, hardware RAID controller, serial/parallel port card, IEEE 1394 cards, Thunderbolt™ card, a USB hub with USB controller hardware or software driver, network inbox driver, camera driver/camera input privacy, audio I/O devices (e.g., speaker privacy, keyboard shortcuts, etc.), SATA/eSATA controller card, PS/2 controller card, non-volatile memory card, PCH storage, CPU storage, etc.

Computer readable NV memory 150 is generally configured to store boot firmware (FW) and other system firmware (not shown), and may include any suitable type of non-volatile memory and/or Flash memory device. As known in the art, boot firmware may generally include software and/or firmware modules for specifying hardware configuration settings, system date/time, boot sequence, etc., and may be implemented as a Basic Input/Output System (BIOS) and/or a Unified Extensible Firmware Interface (UEFI).

Embedded controller (EC) 160 may be configured to boot the information handling system and perform other functions. EC 160 may include read only memory (ROM), random access memory (RAM) and a processing device (e.g., a controller, microcontroller, microprocessor, ASIC, etc.) for executing program instructions stored within its internal ROM and RAM. For example, EC 160 may be configured to execute program instructions (e.g., a boot block) stored within its internal ROM to initiate a boot process for the IHS 100. Each time IHS 100 is powered on or rebooted, an IHS processing device (e.g., host processor 110 and/or EC 160) may execute boot firmware to test and initialize IHS hardware components, perform a Power-On Self-Test (POST) to ensure the hardware configuration is valid and working properly, load an operating system (OS) from computer readable storage device 170, and/or perform a variety of other actions known in the art.

Computer readable storage device 170 may include any type of persistent, non-transitory computer readable storage device, such as one or more hard disk drives (HDDs) or solid-state drives (SSDs), and may be generally configured to store software modules and data. For example, computer readable storage device 170 may store an operating system (OS) 172 and other software modules such as, but not limited to, one or more endpoint-native applications 176 and a web browser 178. The software modules stored within the computer readable storage device 170 may be executed locally by the host processor 110 to perform various operations for the system and/or the user.

A wide variety of endpoint-native applications 176 may be stored within the computer readable storage device 170 and executed locally by the host processor 110 to perform operations for the system and/or the user. Examples of endpoint-native applications 176 include, but are not limited to, local instances of Microsoft Office applications (e.g., Microsoft Word, Excel, Power Point, etc.), meeting applications (e.g., Zoom, Microsoft Teams, Skype, etc.), collaboration applications (e.g., Miro, Slack, etc.), design applications (e.g., Adobe Photoshop, Autodesk, etc.) and other user applications that are locally stored and executed.

NIC 180 enables IHS 100 to communicate with one or more remote systems 192 via a network 190. For purposes of this discussion, network 190 is indicated as a single collective component for simplicity. However, it is appreciated that network 190 may comprise one or more direct connections to other remote systems, as well as a more complex set of interconnections as can exist within a wide area network, such as the Internet. For example, network 190 may be a local area network (LAN), wide area network (WAN), personal area network (PAN), or the like, and the connection to and/or between IHS 100 and network 190 may be wired, wireless or a combination thereof.

In some embodiments, IHS 100 may utilize NIC 180 and network 190 to access one or more cloud-native applications 194 stored within one or more remote systems 192. Examples of cloud-native applications 194 include, but are not limited to, cloud instances of Microsoft Office 365 applications (e.g., Microsoft Word, Excel, Power Point, etc.), cloud meeting applications (e.g., Zoom, Microsoft Teams, Skype, etc.), cloud collaboration applications (e.g., Miro, Slack, etc.), cloud design applications (e.g., Adobe Creative Cloud, Autodesk cloud services, etc.) and other cloud-native applications and services, which are stored/executed on a remote system 192 and accessed via the network 190. In some embodiments, a user may utilize web browser 178 (e.g., Google Chrome, Microsoft Edge, Mozilla Firefox, etc.) to access various websites, cloud-native applications 194 and/or services.

As noted above, a user's workload may include a variety of endpoint-native applications 176 and/or cloud-native applications 194, as well as storage, backend services, and associated policies and security needed to run those applications. In some embodiments, one or more of the endpoint-native applications 176 and/or cloud-native applications 194 may be containerized within a hardware-based or software-based container, as shown for example, in FIG. 2.

Figure 2:
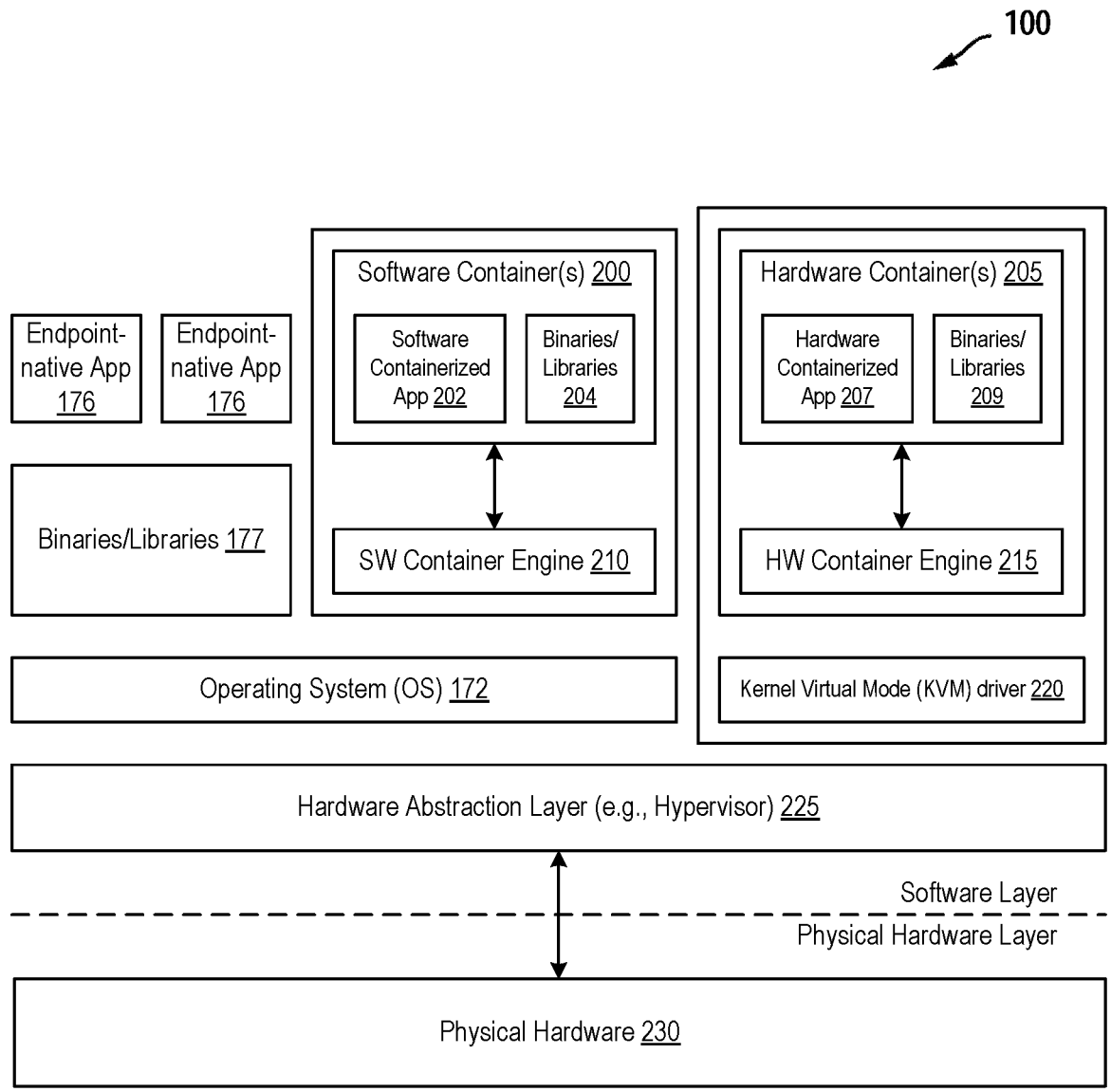
FIG. 2 is a block diagram illustrating various software layer and physical hardware layer components, which may be included within the IHS shown in FIG. 1.

FIG. 2 provides a conceptual block diagram of various software and physical hardware components, which may be included within IHS 100. As shown in FIG. 2, IHS 100 includes a software layer, which is abstracted from, yet shares resources within, the physical hardware components of the IHS. A hardware abstraction layer 225 (e.g., a hypervisor) serves as an interface between the software layer and the physical hardware 230 in the underlying physical hardware layer. A wide variety of hardware resources may be included within the physical hardware layer. In one embodiment, the physical hardware 230 may include host processor 110, system memory 115, GPU 120, PCH 130, sensors 134, I/O devices 140, additional HW/SW components 145, computer readable NV memory 150, EC 160, computer readable storage device 170 and NIC 180, as shown in FIG. 1. It is recognized, however, that the physical hardware 230 may include other hardware resources not shown in FIG. 1, as is known in the art.

The software layer may generally include the host OS 172 and a number of non-containerized endpoint-native applications 176 with associated binaries/libraries 177. In the embodiment shown in FIG. 2, the software layer further includes at least one software container engine 210 (e.g., a Docker engine) for running one or more software-based containers 200 and at least one hardware container engine 215 (e.g., a Hyper-V virtual machine) for running one or more hardware-based containers 205. Each software-based container 200 includes a software containerized application 202 (e.g., the program code for an endpoint-native application 176 or cloud-native application 194) along with everything needed to run the containerized application, such as binaries/libraries 204. Likewise, each hardware-based container 205 includes a hardware containerized application 207 (e.g., the program code for an endpoint-native application 176 or cloud-native application 194) along with everything needed to run the containerized application, such as binaries/libraries 209. While the software container engine 210 shares the host OS 172 and UEFI services with the non-containerized endpoint-native applications 176, the hardware container engine 215 has a separate instance of OS and UEFI services. As a consequence, the hardware container engine 215 provides greater isolation to hardware containerized applications 207 than is provided to software containerized applications 202 and non-containerized endpoint-native applications 176. In some embodiments, a kernel virtual mode (KVM) driver 220 may provide an interface between the hardware container engine 215 and the hardware abstraction layer 225.

As noted above, a user's workspace may include multiple workloads/applications running concurrently on a user's client device and/or remotely in the cloud. As shown in FIG. 2, the workloads running locally on the client device (IHS 100) may include a number of non-containerized endpoint-native applications 176, software containerized applications 202 and/or hardware containerized applications 207. Although not shown in FIG. 2, the user's workspace may also include containerized or non-containerized cloud-based applications, which are run in the cloud and served up to the client device through VDI and PWA. Each workload/application included within the user's workspace may exhibit a certain level of performance, which may be affected by other concurrently running workloads.

Workload performance can be defined by a variety of metrics, which are dependent on the type of workload or "workload type." Examples of workload performance metrics include, but are not limited to, frames per second (FPS) for video conference calls and gaming applications, responsiveness (e.g., latency) for switching workloads and web browsing, bit rate and lag for network streaming applications, and throughput, input/output operations per second (IOPS) and latency for applications with heavy compute and data operations. Other workload performance metrics may be defined for other workload types, such as, for example, audio loss, video loss, network packet loss, I/O bandwidth, floating point operations per second (FLOPS), instructions per second (IPS), etc. Some workload performance metrics may be desirable (or positive), while others are undesirable (or negative). Examples of positive workload performance metrics and negative workload performance metrics are discussed below.

The performance of each workload may be affected by a variety of factors, including but not limited to: (a) the type of container running the workload (such as, e.g., a local software-based container 200, a local hardware-based container 205, a cloud virtual machine (VM), a PWA, etc.), (b) the physical resource limitations of the container running the workload (such as, e.g., the number of processing cores, memory size, etc., assigned to a hardware-based container 205), (c) the presence of other containers running concurrently on the same client device (e.g., multiple software-based containers 200 and/or hardware-based containers 205), (d) the level of security (e.g., high, medium, low) set for the container running the workload, (e) the cloud resource tier assigned to a containerized or non-containerized cloud-native application, (f) the power, thermal, acoustic and/or utilization characteristics of other workloads running on the same client device, and (g) the administrative configuration policies specified for containers running security and/or performance critical workloads. Workload performance may also be affected by other factors not specifically mentioned herein.

User experience has become an important factor in modern client devices. In order to improve user experience, it may be necessary to remediate workload performance for the workloads/applications included within the user's workspace to ensure a seamless experience for the end user. For example, one or more of the user's workloads may experience performance degradation due to any one of the factors mentioned above. In some cases, the workload performance of a workload (e.g., a video conference call) may decrease due to the power, thermal, acoustic and utilization characteristics of another workload (e.g., a computationally intensive application) running on the same client device. In other cases, the workload performance of a workload (e.g., a web browser application) due to the security policies set for the workload. As such, workload remediation becomes a difficult problem to solve when multiple workloads are run concurrently within the user's workspace, due to the variability in workload type, container type and the numerous factors affecting workload performance.

To overcome the above-mentioned problems, the present disclosure provides various embodiments of information handling systems and related methods to provide workload remediation on client devices running multiple concurrent workloads. More specifically, the present disclosure provides software services and computer-implemented methods that utilize workload performance metrics and contextual information to provide workload remediation for each workload/application included within the user's workspace. As described in more detail below, the software services and computer-implemented methods described herein provide an automated iterative remediation framework, which identifies degradation of workload performance metrics of each workload, takes one or more corrective actions to remediate the performance degradation based on observed states obtained for each workload, and measures the efficacy of each corrective action using a weighted scoring function. By iterating through different observed states and corrective actions, and measuring the efficacy of each corrective action via the weighted scoring function, the software services and computer-implemented methods described herein are configured to optimize the workload performance for each workload by selecting the corrective action that optimizes the weighted scoring function for a particular set of observed states.

The techniques described herein may generally be implemented in software, or computer program instructions, which are locally stored and executed within an information handling system. The IHS 100 shown in FIGS. 1 and 2 represents one embodiment of an information handling system that utilizes the techniques described herein to provide workload remediation. As shown in FIG. 1, the workload remediation techniques described herein are performed by workload remediation services 174, which are stored within computer readable storage device 170 and executed by the host processor 110 during OS runtime. In some embodiments, the workload remediation services 174 may include a reinforcement learning (RL) service 310 and a workload management (WM) service 315, as further shown in FIG. 3.

Figure 3:
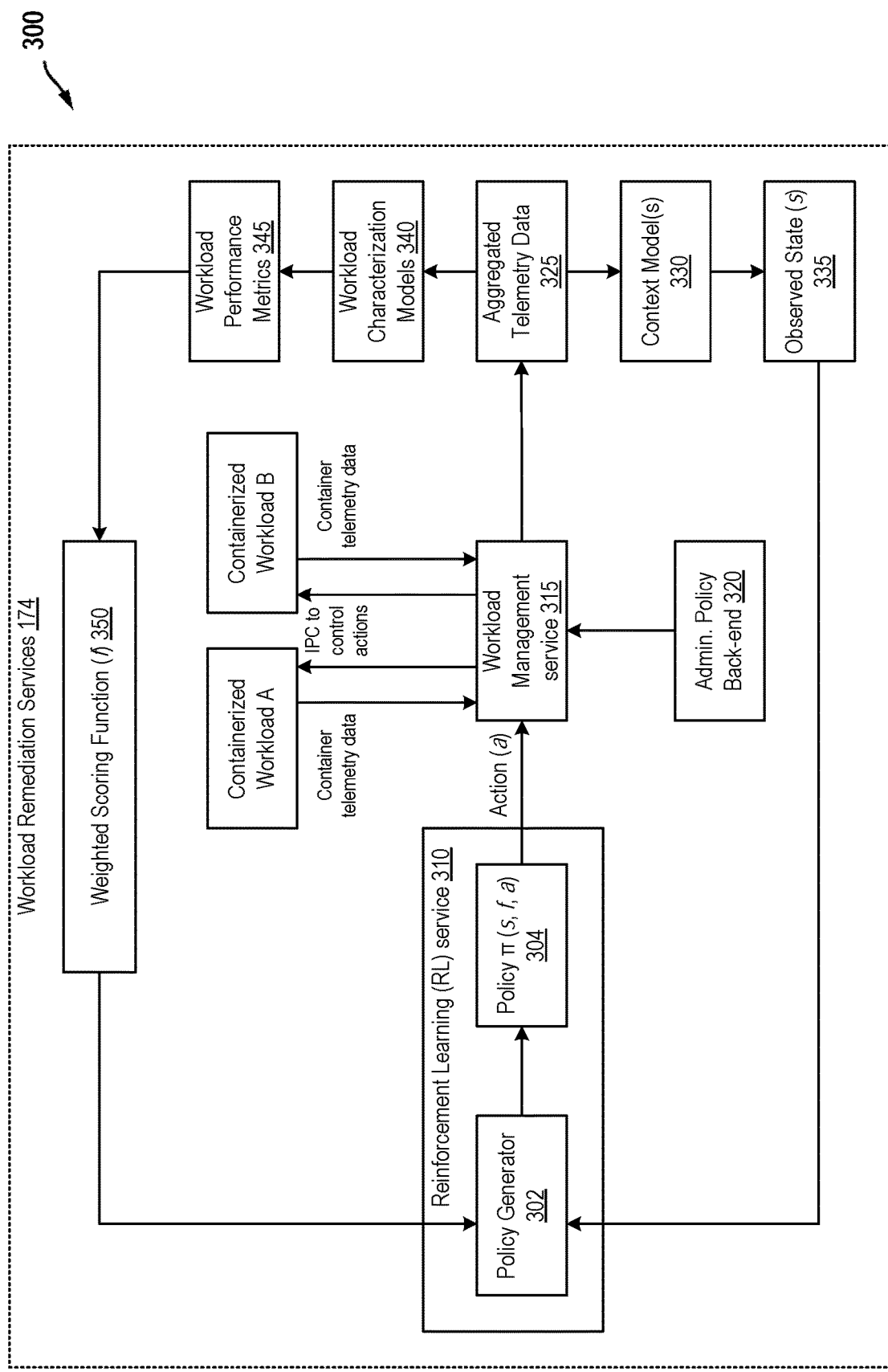
FIG. 3 is a conceptual diagram illustrating the workload remediation techniques described herein.

FIG. 3 provides a conceptual diagram 300 illustrating the workload remediation techniques described herein. As shown in FIG. 3, workload remediation services 174 may generally include a reinforcement learning (RL) service 310 and a workload management (WM) service 315. The RL service 310 and WM service 315 may include program instructions, which are executed by the host processor 110 to perform the techniques described herein. In some embodiments, RL service 310 and WM service 315 may be implemented as OS services.

When executed by the host processor 110, the RL service 310 is configured to take a series of corrective actions (a) based on workload performance metrics and contextual information to maximize the workload performance metrics of each workload included within the user's workspace. The RL service 310 works across multiple concurrent workloads to maximize the workload performance metrics of each workload currently running in the user's workspace. In some embodiments, the workloads may be containerized (e.g., containerized workload A, containerized workload B, etc.) within software-based containers 200 and/or hardware-based containers 205, as shown in FIG. 2. However, the RL service 310 is not limited to containerized workloads, and may take corrective actions for non-containerized applications running locally on the IHS 100 or remotely in the cloud. Prior to execution by host processor 110, the RL service 310 may be pre-trained using a simulated multiple workload environment, or may be untrained but provisioned with proven default policies ($\pi$).

When executed by the host processor 110, the WM service 315 is configured to: (a) obtain telemetry data from each containerized workload (e.g., containerized workload A and containerized workload B) currently running in the user's workspace, and (b) communicate with each containerized workload (e.g., via interprocess communication (IPC) commands) to control the corrective action (a) specified by the RL service 310 for that workload. The WM service 315 may collect a wide variety of container telemetry data from the various containerized workloads. Examples of container telemetry data that may be collected by the WM service 315 include, but are not limited to: the type of container (e.g., a software or hardware container), the hardware/software capabilities of the container (e.g., OS type; OS settings; BIOS settings; hardware resources allocated to the container, such as memory space, disk space, network access, number of processing cores, etc.; power settings/mode, such as AC power, DC power, or hybrid; performance settings, such as energy power plan (EPP), turbo enabled, dynamic tuning technology (DTT) state, etc.; thermal and acoustic settings, etc.) and the container utilization (e.g., what applications and services are running within the container; the processor utilization, memory utilization, read/write capabilities, etc., of the container; what I/O devices the container is connected to/using, etc.).

The WM service 315 may also obtain administrative configuration policies from an administrative policy back-end server 320. Administrative configuration policies may be specified for containerized workloads running security and/or performance critical workloads/applications. Examples of administrative configuration policies that may be collected by the WM service 315 include, but are not limited to: security policies, manageability policies, access tier control, hardware allocation control, software and driver installation control, etc. Other administrative configuration policies may also be collected by the WM service 315 from the administrative policy back-end server 320.

As shown in FIG. 3, the container telemetry data and administrative configuration policies collected by the WM service 315 may be aggregated to produce aggregated telemetry data 325. In some embodiments, the aggregated telemetry data 325 may also include other contextual information about the system and/or the user. For example, the aggregated telemetry data 325 may include contextual information about the system and/or the user, which is collected by the one or more sensors 134, as noted above.

The aggregated telemetry data 325 may be supplied to one or more context models 330 to obtain a set of observed states (s) 335 for a particular workload. In some embodiments, the observed states (s) 335 may include container telemetry data and/or administrative configuration policies pertaining to the particular workload. For example, the observed states (s) 335 may include the container type, the hardware/software capabilities of the container, the container utilization, and/or the security settings or policies specified for the container. In some embodiments, the observed states (s) 335 may further include other contextual information about the system and/or the user. For example, the observed states (s) 335 may further include data pertaining to user presence and/or user focus, the system mode (e.g., laptop mode, tablet mode, etc.), the foreground/focus application, the GPS location of the system/user, the audio/video profile, the peripherals or I/O devices connected and/or currently in use, etc. The observed states (s) 335 may also include other contextual information pertaining to the system, the user and/or the workload. The set of observed states (s) 335 obtained for the particular workload is supplied to the RL service 310, as shown in FIG. 3.

The aggregated telemetry data 325 may also be supplied to one or more workload characterization models 340, which characterizes the workload utilization to obtain workload performance metrics 345 for a particular workload. As noted above, workload performance metrics 345 for a particular workload may generally depend on the type of workload being executed. For example, workload performance metrics 345 may include, but are not limited to, frames per second (FPS) for video conference calls and gaming applications, responsiveness (e.g., latency) for switching workloads and web browsing, bit rate and lag for network streaming applications, and throughput, input/output operations per second (IOPS) and latency for applications with heavy compute and data operations. Other workload performance metrics 345 may be obtained for other types of workloads/applications. If the workload remediation services 174 are being executed for the first time, a default or user defined action (a) may be used to obtain workload performance metrics 345 for the workload.

The workload performance metrics 345 obtained for a particular workload are supplied to a weighted scoring function (f) 350, which is used in the present disclosure to reward/penalize each corrective action (a) taken by the RL service 310. Although the primary goal of the weighted scoring function (f) 350 is to maximize a key workload performance metric 345 (e.g., FPS for video conference calls and gaming applications), the weighted scoring function (f) 350 may utilize a variety of weights (w) to account for a plurality of positive workload performance metrics (pm) and negative workload performance metrics (nm), as shown in EQ. 1 below.

$$f = \Sigma_i w_i pm_i - \Sigma_j w_j nm_j \qquad \text{EQ. 1}$$

In the equation shown above, different weights (w) may be applied to each positive workload performance metric (pm) and each negative workload performance metric (nm) obtained for a particular workload. Examples of positive workload performance metrics (pm) include increasing values of key workload performance metric 345 such as, e.g., higher FPS (e.g., for video conference calls and gaming applications), lower latency (e.g., for switching workloads and web browsing), higher bit rate, larger bandwidth and/or lower lag (e.g., for network streaming applications), and higher throughput, higher TOPS, higher FLOPS and/or lower latency for applications with heavy compute and data operations. Examples of negative workload performance metrics (nm) include undesirable metrics, such as elevated fan noise, high system thermals and/or acoustics, high audio/video loss, high network drops, forced shutdowns and/or restarts, etc. The weights (w) applied to the positive workload performance metrics (pm) and negative workload performance metrics (nm) may be predetermined (e.g., default weights), user defined and/or learned over time. The summation of the weighted positive workload performance metrics ($w_i pm_i$) minus the summation of the weighted negative workload performance metrics ($w_j nm_j$) is used to calculate a total reward (if the difference is a positive value) or a total penalty (if the difference is a negative value). The total reward/penalty calculated by the weighted scoring function (f) 350 is supplied to the RL service 310, as shown in FIG. 3.

The RL service 310 includes a policy generator 302. The policy generator 302 uses the observed states (s) 335 obtained by the one or more context models 330 and the total reward/penalty supplied by the weighted scoring function (f) 350 to generate a policy, π (s, f, a), for taking a given corrective action (a). The RL service 310 may determine that the corrective action (a) is worth taking if the weighted scoring function (f) 350 provides a positive value (i.e., a total reward) to the RL service 310. On the other hand, the RL service 310 may determine that the corrective action (a) is not worth taking if the weighted scoring function (f) 350 provides a negative value (i.e., a total penalty) to the RL service 310.

The RL service 310 may take a wide variety of corrective actions (a) based on the observed states (s) 335 and the value provided by the weighted scoring function (f) 350 for the observed states (s) 335 and actions (a). Examples of corrective actions (a) that may be taken by the RL service 310 include, but are not limited to, switching the workload to a different container type, switching the cloud resource tier (up/down) used to process the workload, switching the hardware resource(s) (up/down) allocated to the container running the workload, switching the security level (high, medium, low) set for the container running the workload, throttling (or boosting) the power/performance for the container/workload, throttling (or hibernating) other containers/workloads currently running in the user's workspace. Other corrective actions (a) may also be taken by the RL service 310.

For each workload within the user's workspace, the RL service 310 attempts to optimize the weighted scoring function (f) by iterating through different observed states (s) and corrective actions (a), measuring the efficacy of each corrective action (a) via the weighted scoring function (f) and selecting the particular corrective action (a) that optimizes the weighted scoring function for a particular set of observed states (s). In other words, the RL service 310 optimizes the workload performance metrics 345 for each workload by selecting the policy (π), and therefore the corrective action (a), that provides the best weighted scoring function (f) (e.g., the highest positive value) for a particular set of observed states (s) for that workload. Once a policy (π) is selected for a particular workload, it may be applied each time the same set of observed states (s) is detected for that workload.

Figure 4:
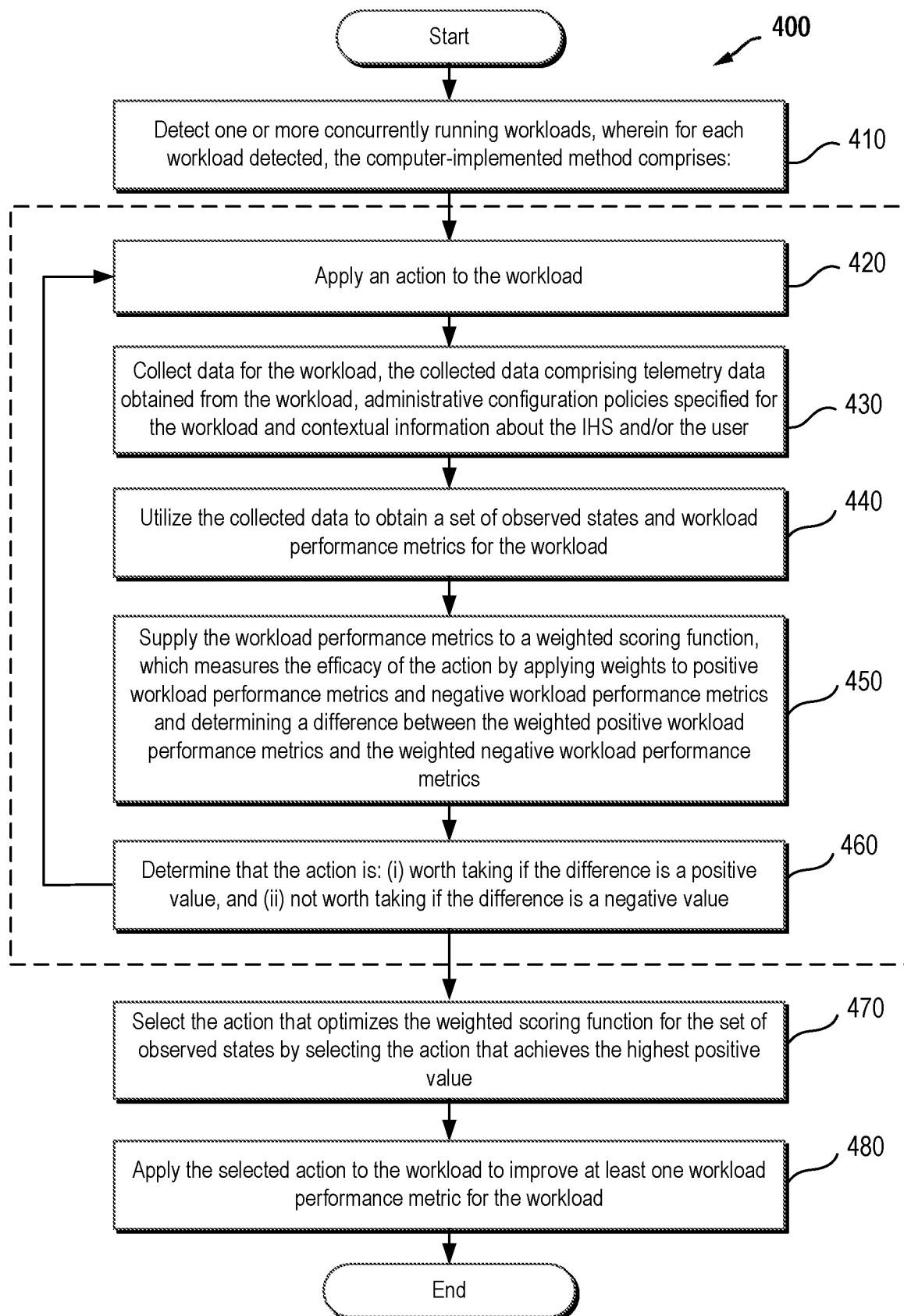
FIG. 4 is a flowchart diagram illustrating one embodiment of a method that utilizes the techniques described herein to perform workload remediation for a plurality of workloads included within a user's workspace.

FIG. 4 illustrates one embodiment of a method 400 that utilizes the techniques described herein to perform workload remediation for a plurality of workloads included within a user's workspace. The method 400 shown in FIG. 4 is a computer implemented method performed by a host processor of an information handling system (IHS). In one example embodiment, the computer implemented method 400 may be performed by host processor 110 executing program instructions contained within workload remediation services 174. It will be recognized that the embodiment shown in FIG. 4 is merely exemplary and additional methods may utilize the techniques described herein. Further, additional steps may be added to the method shown in the FIG. 4 as the steps described are not intended to be exclusive. Moreover, the order of the steps is not limited to the order shown in FIG. 4 as different orders may occur and/or various steps may be performed in combination or at the same time.

In some embodiments, the computer implemented method 400 may begin by detecting one or more concurrently running workloads (in step 410). For each workload detected, the computer implemented method 400 may apply an action to the workload (in step 420), collect data for the workload (in step 430), utilize the collected data to obtain a set of observed states and workload performance metrics for the workload (in step 440) and supply the workload performance metrics to a weighted scoring function, which measures the efficacy of the action (in step 450). In some embodiments, the data collected for the workload (in step 430) may include telemetry data obtained from the workload, administrative configuration policies specified for the workload and contextual information about the IHS and/or the user, as described above.

The workload performance metrics may include positive workload performance metrics and negative workload performance metrics, as noted above. In some embodiments, the weighted scoring function may measure the efficacy of the action (in step 450) by: applying weights to the positive workload performance metrics and the negative workload performance metrics, and determining a difference between the weighted positive workload performance metrics and the weighted negative workload performance metrics. In some embodiments, the computer implemented method 400 may deterring that the action applied (e.g., in step 420) is: (i) worth taking if the difference is a positive value, and (ii) not worth taking if the difference is a negative value.

Next, the computer implemented method 400 may apply a new action to the workload (in step 420) and may repeat steps 430-460 one or more times. In this manner, the computer implemented method 400 may select a particular action that optimizes the weighted scoring function for the set of observed states by selecting the action that achieves the highest positive value (in step 470). Once the particular action is selected (in step 470), the computer implemented method 400 may apply the selected action to the workload to improve at least one workload performance metric for the workload (in step 480).

The workload remediation services 174 shown in FIGS. 1 and 3 and the computer implemented method 400 shown in FIG. 4 improve the way in which an information handling system (such as IHS 100) functions, in at least one respect, by providing an automated iterative process that performs workload remediation based on workload performance metrics and contextual information about the system, the user and/or the workload. By performing workload remediation, as described herein, the workload remediation services 174 and the computer implemented method 400 enable the IHS 100 to perform workload remediation for multiple concurrently running workloads, so that workload performance can be optimized or improved for one or more of the workloads. This represents an improvement over conventional one-off remediation solutions, which are either pre-programmed based on heuristics or trained using artificial intelligence (AI) and machine learning (ML) to fix one problem at a time. A skilled artisan having benefit of this disclosure may recognize other ways in which the workload remediation services 174 and the computer implemented method 400 described herein may be used to improve the functioning of an information handling system, such as IHS 100.

The workload remediation techniques described herein may be used to improve workload performance in a wide variety of use cases. For example, a user may participate in a web conference call running in a web browser application (e.g., workload A) while a computationally intensive application (e.g., workload B) is running on the same client device. The computationally intensive application requires additional processing power and/or speeds, which may increase the system temperature and lead to increased fan speeds. The noise from the increased fan speed may be undesirable while the web conference call is taking place. In this case, the workload remediation techniques described herein may be used to improve the workload performance for one or more of the workloads by selecting corrective actions based on workload performance metrics and contextual information about the system, the user and/or the workload. For example, the workload remediation techniques may improve the workload performance of the web conference call by reducing the fan speed or setting the performance level of the computationally intensive application to certain thermal/acoustic settings. Other corrective actions may also be taken.

Although described above in the context of improving workload performance for one or more different workloads/applications, the workload remediation techniques described herein may alternatively be used to prioritize certain actions over others for one or more tabs within a web browser application. For example, a user in a public location (such as a coffee shop) may use a web browser application to replay a video in a first web browser tab and participate in a web conference call in a second web browser tab. One tab may need to be highly secure with display privacy mode enabled, which may impact the performance of the other tab. In such a case, the workload remediation techniques described herein may be used to prioritize privacy and security over performance for one or more of the tabs since the user is in a public place.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. An information handling system (IHS) that is a local user client device comprising:
    a computer readable storage device that stores workload remediation services, which are executable to improve workload performance of a plurality of workloads included within a user's workspace on the local user client device, the plurality of workloads including a plurality of local workloads; and
    a host processor coupled to the computer readable storage device, wherein for each given local workload within the plurality of workloads, the host processor is programmed to execute the workload remediation services while the plurality of local workloads are concurrently executing locally on the local user client device to:
        identify degradation of at least one workload performance metric corresponding to the given local workload;
        take one or more corrective actions to remediate the degradation of the at least one workload performance metric based on a set of observed states obtained for the given local workload;
        measure the efficacy of each corrective action using a weighted scoring function; and
        improve the workload performance for the given local workload by selecting a particular corrective action that optimizes the weighted scoring function for the set of observed states;
    where each given one of the plurality of local workloads included within the user's workspace is an endpoint-native application stored locally within the computer readable storage device of the local user client device and executed locally by the host processor of the local user client device.

2. The information handling system of claim 1, wherein the plurality of workloads included within the user's workspace further comprise at least one additional workload that is a
    cloud-native application stored and executed remotely on a remote server or cloud instance.

3. The information handling system of claim 2, wherein one or more of the plurality of workloads is a containerized application.

4. The information handling system of claim 1, wherein the at least one workload performance metric is dependent on the workload.

5. The information handling system of claim 4, wherein the at least one workload performance metric comprises one or more of the following: frames per second (FPS), latency, bit rate, lag, throughput, and input/output operations per second (IOPS).

6. The information handling system of claim 1, wherein the weighted scoring function utilizes a variety of weights to account for a plurality of positive workload performance metrics and negative workload performance metrics associated with each corrective action.

7. The information handling system of claim 1, wherein the host processor is programmed to execute the workload remediation services to improve the workload performance for each given local workload by iteratively applying different corrective actions to the given local workload and collecting data for the given local workload that includes one or more different observed states for the given local workload with each of the different corrective actions, measuring the efficacy of each corrective action for the given local workload via the weighted scoring function, and then selecting the particular corrective action for the given local workload that optimizes the weighted scoring function for the set of observed states.

8. The information handling system of claim 1, wherein the plurality of workloads included within the user's workspace includes at least one containerized application.

9. The information handling system of claim 8, wherein the set of observed states include telemetry data obtained from the containerized application.

10. The information handling system of claim 8, wherein the one or more corrective actions comprise one or more of the following: switching the containerized application of a given local workload that is executing locally on the local user client device within the user's workspace to a different container type that is executing locally on the local user client device within the user's workspace, switching local hardware resources of the local user client device allocated to a container running the containerized application of a given local workload that is executing locally on the local user client device within the user's workspace, switching a security level set for the container running the containerized application of a given local workload that is executing locally on the local user client device within the user's workspace, throttling power or performance for the container running the containerized application of a given local workload that is executing within the user's workspace locally on the local user client device, boosting the power or performance for the container running the containerized application of a given workload that is executing within the user's workspace locally on the local user client device, throttling other containers or workloads concurrently running locally on the local user client device in the user's workspace, or hibernating other containers or workloads concurrently running locally on the local user client device in the user's workspace.

11. The information handling system of claim 1, where the local user client device is a desktop computer, laptop computer, tablet computer, or a smart phone.

12. The information handling system of claim 1, where the set of observed states includes contextual information about the local user client device that comprises at least one of: geographic location of the local user client device; system operation information including applications currently running on the local user client device; identity of peripherals or I/O devices connected to and/or currently used by the local user client device; system mode of the local user client device including laptop mode or tablet mode; system performance information of the local user client device including processor performance when running the endpoint-native applications or the number of concurrently running endpoint-native applications; or network access information for the IHS including whether the user of the local user client device is using public Wi-Fi without authentication or home Wi-Fi or corporate Wi-fi to access network resources.

13. The information handling system of claim 1, where the set of observed states includes contextual information about the user of the local user client device that comprises at least one of whether the user is physically present or absent at the local user client device, or what is eye focus or gaze of the user of the local user client device.

14. The information handling system of claim 13, further comprising at least one sensor coupled to the host processor of the local user client device, the sensor comprising a camera, an accelerometer, an eye tracking device, a human gaze sensor, a motion sensor, an acoustic sensor, a vibration sensor, a proximity sensor, an IR sensor, or a temperature sensor; and where the host processor of the local user client device is programmed to analyze sensor data received from the at least one sensor to determine at least one of: whether the user is physically present or absent at the local user client device, or what is eye focus or gaze of the user of the local user client device.

15. An information handling system (IHS), comprising:
a computer readable storage device that stores workload remediation services, which are executable to improve workload performance of a plurality of workloads included within a user's workspace; and
a host processor, wherein for each workload within the plurality of workloads, the host processor executes the workload remediation services to:
identify degradation of at least one workload performance metric corresponding to the workload;
take one or more corrective actions to remediate the degradation of the at least one workload performance metric based on a set of observed states obtained for the workload;
measure the efficacy of each corrective action using a weighted scoring function; and
improve the workload performance for the workload by selecting a particular corrective action that optimizes the weighted scoring function for the set of observed states;
wherein the weighted scoring function utilizes a variety of weights to account for a plurality of positive workload performance metrics and negative workload performance metrics associated with each corrective action; and
wherein the weighted scoring function calculates a difference between a summation of weighted positive workload performance metrics and a summation of weighted negative workload performance metrics.

16. The information handling system of claim 15, wherein the workload remediation services are further executed by the host processor to:
determine that the corrective action is worth taking, if the difference calculated by the weighted scoring function is a positive value;
determine that the corrective action is not worth taking, if the difference calculated by the weighted scoring function is a negative value; and
select the particular corrective action having the highest positive value.

17. A computer implemented method to provide workload remediation for a plurality of workloads included within a user's workspace on a local user client device, the computer implemented method comprising using a host processor of an information handling system (IHS) that is the local user client device to execute program instructions stored within a computer readable storage device of the IHS to perform the computer implemented method by executing a plurality of local workloads included within the user's workspace on the local user client device, and for each given local workload within the plurality of workloads within the plurality of workloads by:
detecting one or more concurrently running local workloads executed by the host processor of the local user client device, wherein for each given local workload detected, the computer implemented method further comprises:
applying an action to the given local workload,
collecting data for the given local workload, the collected data comprising telemetry data obtained from the given local workload, administrative configuration policies specified for the given local workload and contextual information and the IHS and/or the user,
utilizing the collected data to obtain a set of observed states and workload performance metrics for the given local workload,
supplying the workload performance metrics to a weighted scoring function, which measures the efficacy of the action,
applying a new action to the given local workload and repeating said collecting, said utilizing and said supplying one or more times, and
improving workload performance for the given local workload by selecting a particular action that optimizes the weighted scoring function for the set of observed states;
where each given one of the plurality of local workloads included within the user's workspace is an endpoint-native application stored locally within the computer readable storage device of the local user client device and executed locally by the host processor of the local user client device.

18. The computer implemented method of claim 17, further comprising applying the selected action to the given local workload to improve at least one workload performance metric for the given local workload.

19. The computer implemented method of claim 18, wherein the at least one workload performance metric comprises one or more of the following: frames per second (FPS), latency, bit rate, lag, throughput, and input/output operations per second (IOPS).

20. The computer implemented method of claim 17, wherein the plurality of workloads included within the user's workspace includes at least one containerized application.

21. The computer implemented method of claim 20, wherein the new action is selected from one or more of the following: switching the containerized application of a given local workload that is executing locally on the local user client device within the user's workspace to a different container type that is executing locally on the local user client device within the user's workspace, switching local hardware resources of the local user client device allocated to a container running the containerized application of a given local workload that is executing locally on the local user client device within the user's workspace, switching a security level set for the container running the containerized application of a given local workload that is executing locally on the local user client device within the user's workspace, throttling power or performance for the container running the containerized application of a given local workload that is executing locally on the local user client device within the user's workspace, boosting the power or performance for the container running the containerized application of a given local workload that is executing locally on the local user client device within the user's workspace, throttling other containers or workloads concurrently running locally on the local user client device in the user's workspace, or hibernating other containers or workloads concurrently running locally on the local user client device in the user's workspace.

22. The computer implemented method of claim 17, where the local user client device is a desktop computer, laptop computer, tablet computer, or a smart phone.

23. The computer implemented method of claim 17, where the set of observed states includes contextual information about the local user client device that comprises at least one of: geographic location of the local user client device; system operation information including applications currently running on the local user client device; identity of peripherals or I/O devices connected to and/or currently used by the local user client device; system mode of the local user client device including laptop mode or tablet mode; system performance information of the local user client device including processor performance when running the endpoint-native applications or the number of concurrently running endpoint-native applications; or network access information for the IHS including whether the user of the local user client device is using public Wi-Fi without authentication or home Wi-Fi or corporate Wi-fi to access network resources.

24. The computer implemented method of claim 17, where the set of observed states includes contextual information about the user of the local user client device that comprises at least one of whether the user is physically present or absent at the local user client device, or what is eye focus or gaze of the user of the local user client device.

25. The computer implemented method of claim 24, further comprising: receiving sensor data in the host processor of the local user client device from a camera, an accelerometer, an eye tracking device, a human gaze sensor, a motion sensor, an acoustic sensor, a vibration sensor, a proximity sensor, an IR sensor, or a temperature sensor; and analyzing the received sensor data to determine at least one of whether the user is physically present or absent at the local user client device or what is eye focus or gaze of the user of the local user client device.

26. A computer implemented method to provide workload remediation for a plurality of workloads included within a user's workspace, wherein the computer implemented method is performed by a host processor of an information handling system (IHS) executing program instructions stored within a computer readable storage device of the IHS, and wherein for each workload within the plurality of workloads, the computer implemented method comprises:
    detecting one or more concurrently running workloads, wherein for each workload detected, the computer implemented method further comprises:
        applying an action to the workload,
        collecting data for the workload, the collected data comprising telemetry data obtained from the workload, administrative configuration policies specified for the workload and contextual information and the IHS and/or the user,
        utilizing the collected data to obtain a set of observed states and workload performance metrics for the workload,
        supplying the workload performance metrics to a weighted scoring function, which measures the efficacy of the action,
        applying a new action to the workload and repeating said collecting, said utilizing and said supplying one or more times, and
        improving workload performance for the workload by selecting a particular action that optimizes the weighted scoring function for the set of observed states;
    wherein the workload performance metrics include positive workload performance metrics and negative workload performance metrics, and wherein the weighted scoring function measures the efficacy of the action by:
        applying weights to the positive workload performance metrics and the negative workload performance metrics, and
        determining a difference between the weighted positive workload performance metrics and the weighted negative workload performance metrics.

27. The computer implemented method of claim 26, wherein after said supplying and before said applying a new action, the computer implemented method further comprises:
    determining that the action is: (i) worth taking if the difference is a positive value, and (ii) not worth taking if the difference is a negative value.

28. The computer implemented method of claim 27, wherein said improving workload performance for the workload comprises selecting the particular action that optimizes the weighted scoring function for the set of observed states by selecting the action that achieves the highest positive value.

* * * * *